United States Patent
Jasper

(10) Patent No.: US 9,556,831 B1
(45) Date of Patent: Jan. 31, 2017

(54) THERMAL FUEL DELIVERY SYSTEM WITH INSERTION ASSEMBLY

(71) Applicant: FRANK JASPER PTY LTD., Mount Hawthorn (AU)

(72) Inventor: Frank Raymond Jasper, Perth (AU)

(73) Assignee: FRANK JASPER PTY LTD., Mount Hawthorn (AU)

( * ) Notice: Subject to any disclaimer, the term of this patent is extended or adjusted under 35 U.S.C. 154(b) by 0 days.

(21) Appl. No.: 14/829,326

(22) Filed: Aug. 18, 2015

(51) Int. Cl.
*F02M 31/02* (2006.01)
*F02M 31/04* (2006.01)
*F02M 35/116* (2006.01)
*F02M 31/08* (2006.01)

(52) U.S. Cl.
CPC ............ *F02M 31/04* (2013.01); *F02M 31/08* (2013.01); *F02M 35/116* (2013.01)

(58) Field of Classification Search
CPC .... F02M 31/02; F02M 31/005; F02M 31/045; F02M 31/08; F02M 31/145; F02M 31/18; F02M 31/14; F02M 53/02; F02M 31/04; F02M 35/116
See application file for complete search history.

(56) References Cited

U.S. PATENT DOCUMENTS

| | | |
|---|---|---|
| 3,717,131 A | 2/1973 | Chana et al. |
| 3,892,213 A | 7/1975 | Cole |
| 4,147,142 A | 4/1979 | Little et al. |
| 5,544,629 A | 8/1996 | Ohata et al. |
| 6,192,849 B1 | 2/2001 | Powell |
| 7,510,171 B2 | 3/2009 | Glew |
| 2006/0118069 A1* | 6/2006 | Snyder ................ F02F 7/0012 123/54.4 |

FOREIGN PATENT DOCUMENTS

| | | |
|---|---|---|
| EP | 2375048 A1 | 10/2011 |
| WO | 2015/034737 A1 | 3/2015 |

OTHER PUBLICATIONS

International Search Report issued in corresponding International Application No. PCT/IB2016/054905, dated Nov. 9, 2016, 6 pages.

* cited by examiner

*Primary Examiner* — Jacob Amick
(74) *Attorney, Agent, or Firm* — Baker & McKenzie, LLP

(57) ABSTRACT

A thermal fuel delivery system includes an insertion assembly and a fuel device. The insertion assembly includes a housing defining a cavity for housing the fuel device. The housing is disposed above and coupled to a pair of frame members via a plurality of connecting members. The frame members extend laterally away from the housing. The insertion assembly further includes an intake manifold coupled to the housing via a tube. A plurality of runner tubes extend laterally away from the intake manifold and pass through the frame members at an inner portion of the frame members and terminate at an outer portion of the frame members.

19 Claims, 11 Drawing Sheets

THERMAL FUEL DELIVERY SYSTEM WITH INSERTION ASSEMBLY

BACKGROUND

Current internal combustion engines often take the form of a V engine in which the cylinders and pistons are aligned in two separate planes such that they are arranged in a "V" configuration when viewed from an end of the engine block. The "V" configuration was originally developed to reduce the size and weight of inline engine configurations and are now commonplace in today's automobiles and other motorized vehicles. V-engines are thus adapted for use with conventional fuel systems, such as direct injection and multi-point fuel injection systems.

Fuel systems for internal combustion engines are constantly evolving as concerns of environmental impact increase. One such recently developed fuel system is described in U.S. Pat. No. 7,510,171 and provides for an apparatus for delivering thermally cracked fuel into the inlet manifold and thereafter to the cylinders of an internal combustion engine. The apparatus of U.S. Pat. No. 7,510,171 may interact with various types of heat exchangers to impart heat to the fuel delivered to the fuel system. For example, U.S. Pat. No. 8,881,711 describes a fuel system having a heat exchanger for using heated exhaust air to heat fresh cool air prior to such fresh cool air being delivered to a fuel system.

V-engines with traditional fuel injection systems require a large amount of space to accommodate a large number of stock parts, such as injectors for each cylinder, fuel rails, etc.

Accordingly, new thermal fuel delivery systems and methods are needed to accommodate new technologies, reduce stock parts needed for integration of an engine to a vehicle and for adapting to the V-shape of internal combustion engines.

BRIEF SUMMARY

A thermal fuel delivery system includes an insertion assembly and a fuel device. The insertion assembly includes a housing defining a cavity for housing the fuel device. The housing is disposed above and coupled to a pair of frame members via a plurality of connecting members. The frame members extend laterally away from the housing. The insertion assembly further includes an intake manifold coupled to the housing via a tube. A plurality of runner tubes extend laterally away from the intake manifold and pass through the frame members at an inner portion of the frame members and terminate at an outer portion of the frame members.

An insertion assembly for adapting a fuel device to an engine includes a housing defining a cavity. The housing is disposed above and coupled to a pair of frame members via a plurality of connecting members. The frame members extend laterally away from the housing. The insertion assembly further includes an intake manifold coupled to the housing via a tube, and a plurality of runner tubes extending laterally away from the intake manifold. The runner tubes pass through the frame members at an inner portion of the frame members and terminate at an outer portion of the frame members.

A system for delivering fuel mixture to an internal combustion engine includes a thermal fuel delivery system for delivering a fuel mixture to an internal combustion engine. The thermal fuel delivery system includes an insertion assembly having a housing that defines a cavity for receiving a fuel device. The housing is disposed above and coupled to a pair of frame members via a plurality of connecting members. The frame members extend laterally away from the housing. The insertion assembly further includes an intake manifold coupled to the housing via a tube and a plurality of runner tubes extending laterally away from the intake manifold. The runner tubes pass through the frame members at an inner portion of the frame members and terminate at an outer portion of the frame members. The system further includes a heat exchanger in communication with heated exhaust air from the internal combustion engine and fresh cool air. The heat exchanger is adapted to transfer heat energy from the heated exhaust air to the fresh cool air and provide the heated fresh air to the fuel device.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
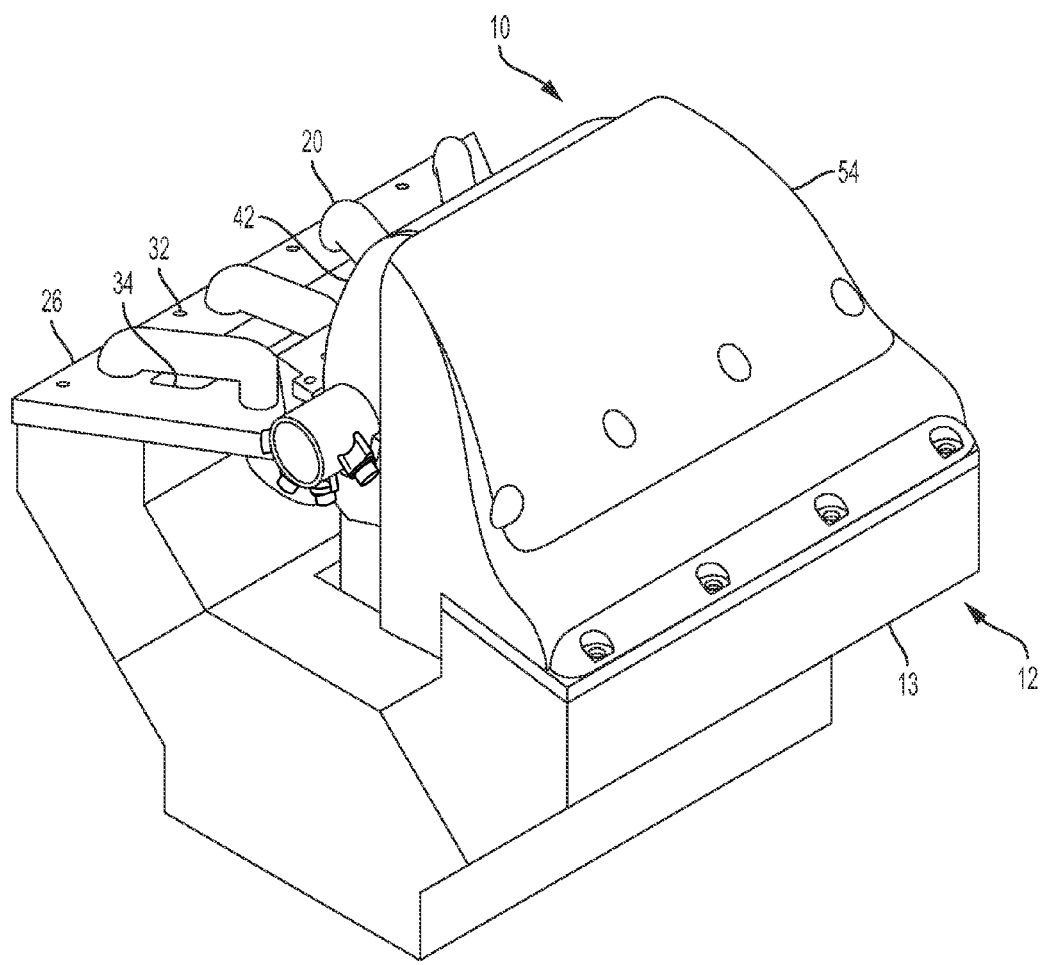
FIG. 1 is a front perspective view of a thermal fuel delivery system according to the present disclosure.
Figure 2:
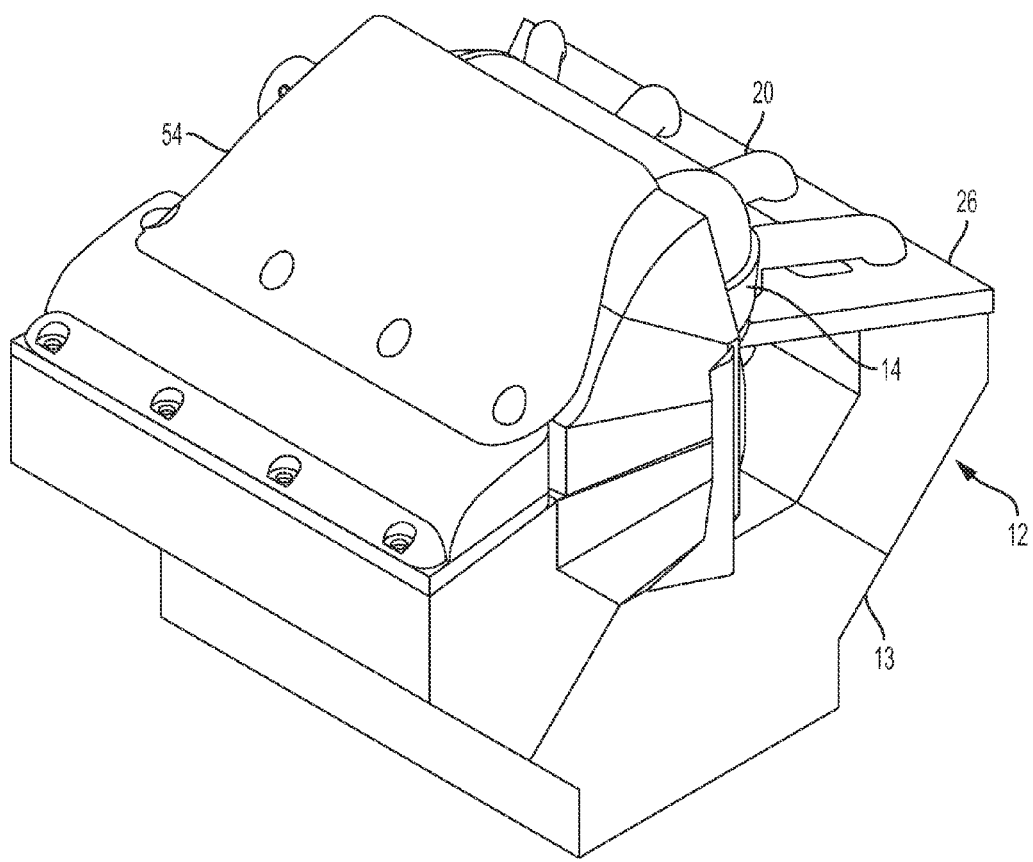
FIG. 2 is a rear perspective view of the thermal fuel delivery system of FIG. 1.

Various embodiments of a thermal fuel delivery system and associated methods of using such thermal fuel delivery systems according to the present disclosure are described. It is to be understood, however, that the following explanation is merely exemplary in describing the devices and methods of the present disclosure. Accordingly, several modifications, changes and substitutions are contemplated.

Hydrocarbons such as automotive fuel (e.g., gas—both leaded and unleaded, diesel, ethanol) can be cracked to reduce complex organic molecules to simpler molecules. Powering an internal combustion engine with these simpler molecules can lead to increased combustion efficiency. One approach for cracking fuel is to subject it to a high temperature and may be referred to as thermal cracking. Thermal cracking has not been widely used in internal combustion engines at least in part because of difficulty in achieving the temperatures necessary to provide thermal cracking. The energy used in heating the fuel must be less than the performance gains to provide a net increase in efficiency. Further, systems for providing thermally cracked fuel have not heretofore been adapted to the V-design of engines. The present disclosure relates to a housing design that may be cast or injection molded and fitted directly to cylinder heads within the "V" of an internal combustion engine. The housing design may be provided as an original equipment manufacture (OEM) part or as an aftermarket part. The housing may receive a fuel system for providing thermally cracked fuel, which is heated using heated exhaust air.

FIGS. 1-6 illustrate an exemplary thermal fuel delivery system 10 according to one embodiment of the present disclosure. The fuel delivery system 10 is shown integrated with a V-engine 12, which may otherwise be a standard V-engine associated with automobiles or other vehicles. The fuel delivery system 10 includes a housing 14, which is coupled to an outlet 16 for delivering fuel mixture to an intake manifold 18. A plurality of runner tubes 20 are coupled between the intake manifold 18 and the cylinders 21 of the internal combustion engine.

Figure 4:
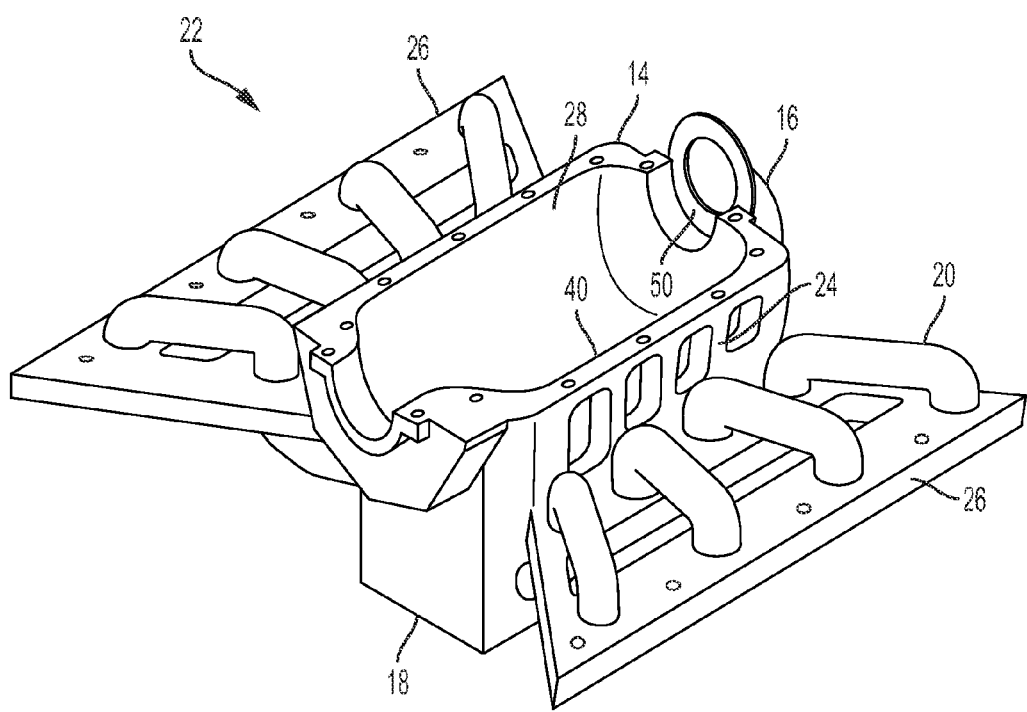
FIG. 4 is a perspective view of a housing with intake manifold of the thermal fuel delivery system of FIG. 1.

As best shown in FIG. 4, an insertion assembly 22 includes the housing 14 and intake manifold 18, which may be configured as a unitary structure, thus reducing complexity of manufacture and installation into V-engines. The housing 14 may be disposed above the intake manifold 18 such that the outlet 16 coupling the housing and intake manifold is curved to have a substantially hemispherical shape. It will be appreciated that the housing may also be disposed below the intake manifold, or in still another alternative, the intake manifold may be omitted entirely and the fuel device may be directly connected to the runner tubes discussed in further detail below.

The insertion assembly 22 further includes a plurality of connecting members or columns 24 that couple between the housing 14 and a pair of frame members 26 that slant downwardly away from the housing. In some embodiments, the columns 24 are integrally formed with the housing 14 and frame members 26, while in other embodiments, one or both of the housing and frame members is coupled to the columns via mechanical fasteners, such as bolts or the like. The columns 24 cooperate to define a plurality of apertures 28, which reduce the weight of the insertion assembly 22 and provide for a cooling effect on the various components of the insertion assembly.

The runner tubes 20 extend from the intake manifold 18 to deliver fuel mixture to the cylinders of the engine. In the depicted embodiment, four runner tubes 20 extend from each side of the intake manifold 18 in order to accommodate a V-8 engine. Of course, other embodiments are contemplated in which fewer or additional cylinders require fewer or additional runner tubes 20 for delivering fuel mixture to the engine. In some embodiments, the proximal and distal runner tubes 20 of the V-8 embodiment are configured differently than the intermediate runner tubes. For example, with reference to FIGS. 5-6, the proximal and distal runner tubes 20a and 20d may initially slope downwardly from the intake manifold 18 relative to a plane defined by the top surface of the intake manifold. The proximal and distal runner tubes 20a and 20d may then curve upwards passing through an interior portion of the frame members 26 before again sloping slightly downwardly culminating in an elbow that delivers the fuel mixture to the engine cylinders through an outer portion of the frame members. The intermediate runner tubes 20b and 20c may have substantially the same configuration and initially slope upwardly from the intake manifold 18, pass through an interior portion of the frame members 26 before sloping downwardly towards the engine block 13 of the engine 12. Similar to the proximal and distal runner tubes 20a and 20d, the intermediate runner tubes 20b and 20c culminate in an elbow that delivers the fuel mixture to the engine cylinders through an outer portion of the frame members. Preferably the runner tubes 20 are respectively kept to a similar length. For example, imaginary paths respectively traced along central axial axes of the runner tubes from points at which the runner tubes intersect with the housing to where they meet the engine cylinders have similar lengths within a small percentage, such as 10% or less. In an embodiment, these imaginary lengths may be the same. Of course, some small variation due to manufacturing and design tolerances is to be expected. Such small variance is within the usage of the term "same".

Figure 3:
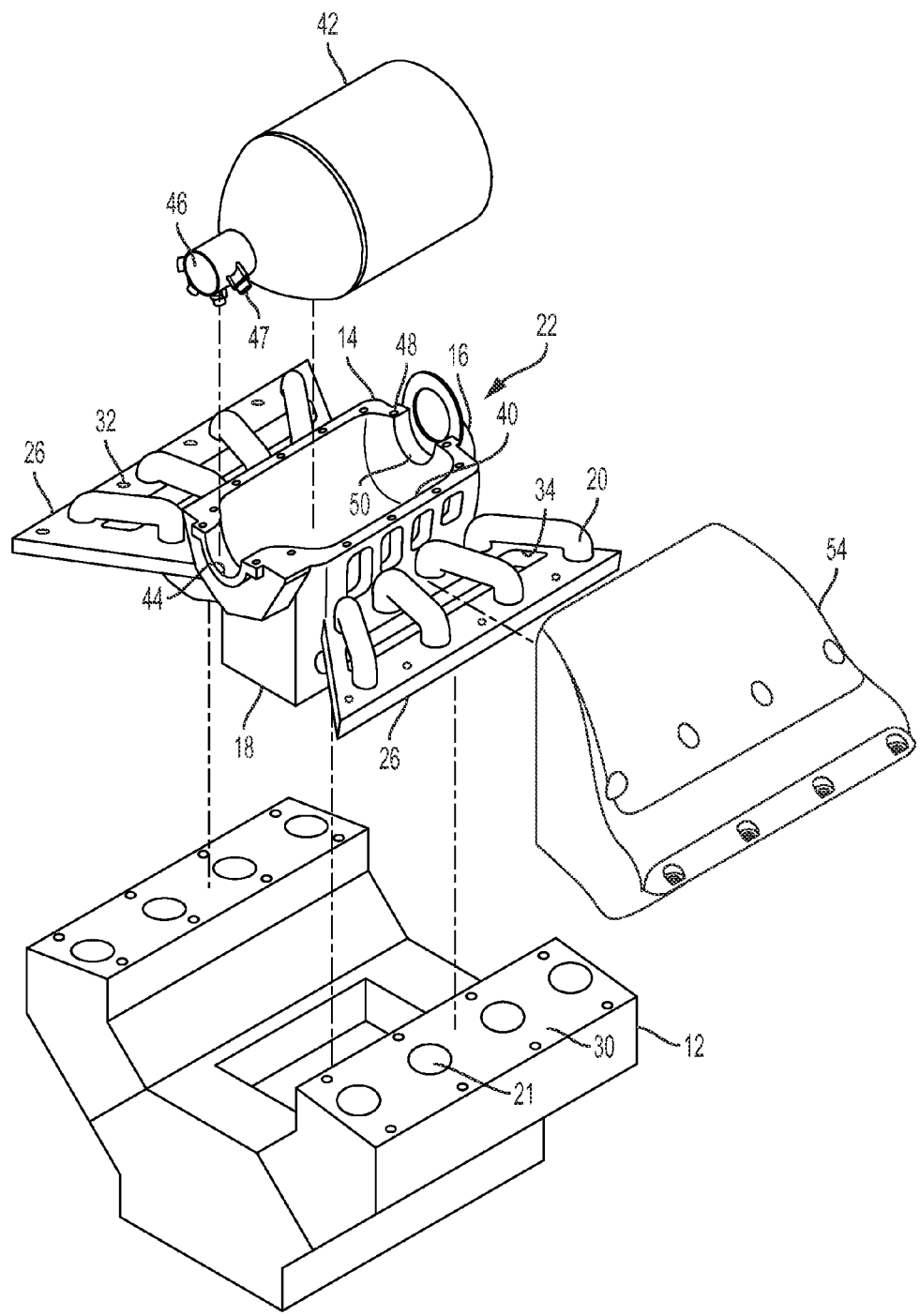
FIG. 3 is an exploded view of the thermal fuel delivery system of FIG. 1.
Figure 5:
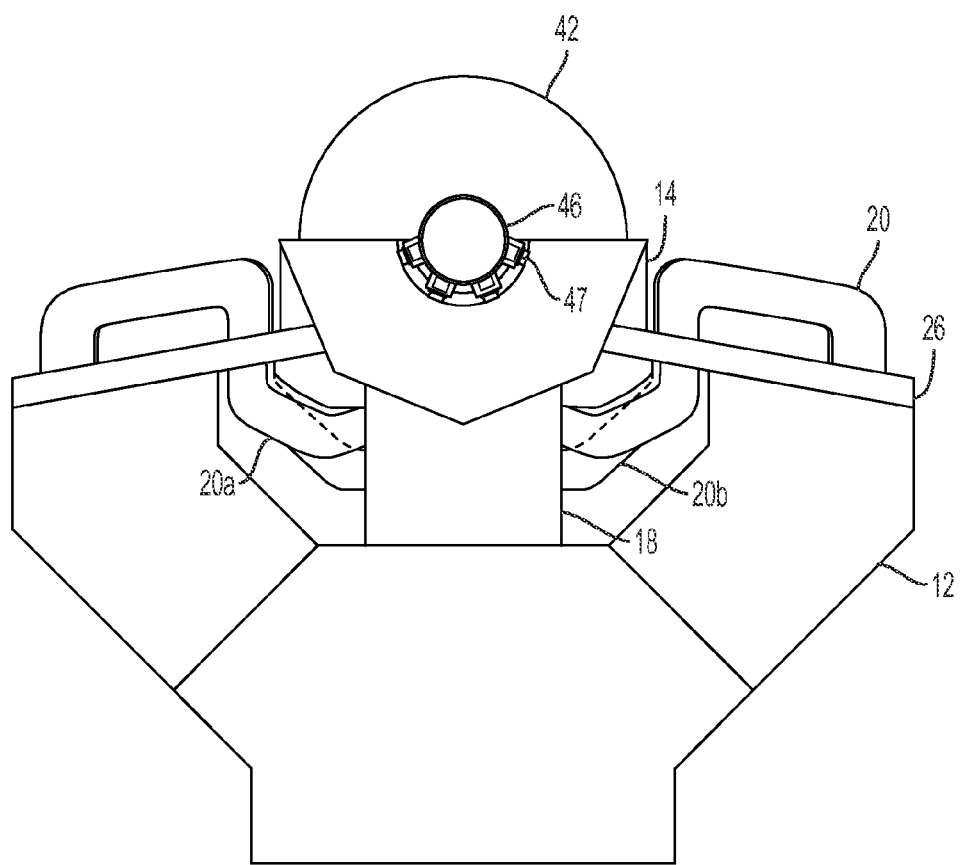
FIG. 5 is a front elevational view of the thermal fuel delivery system of FIG. 1.
Figure 6:
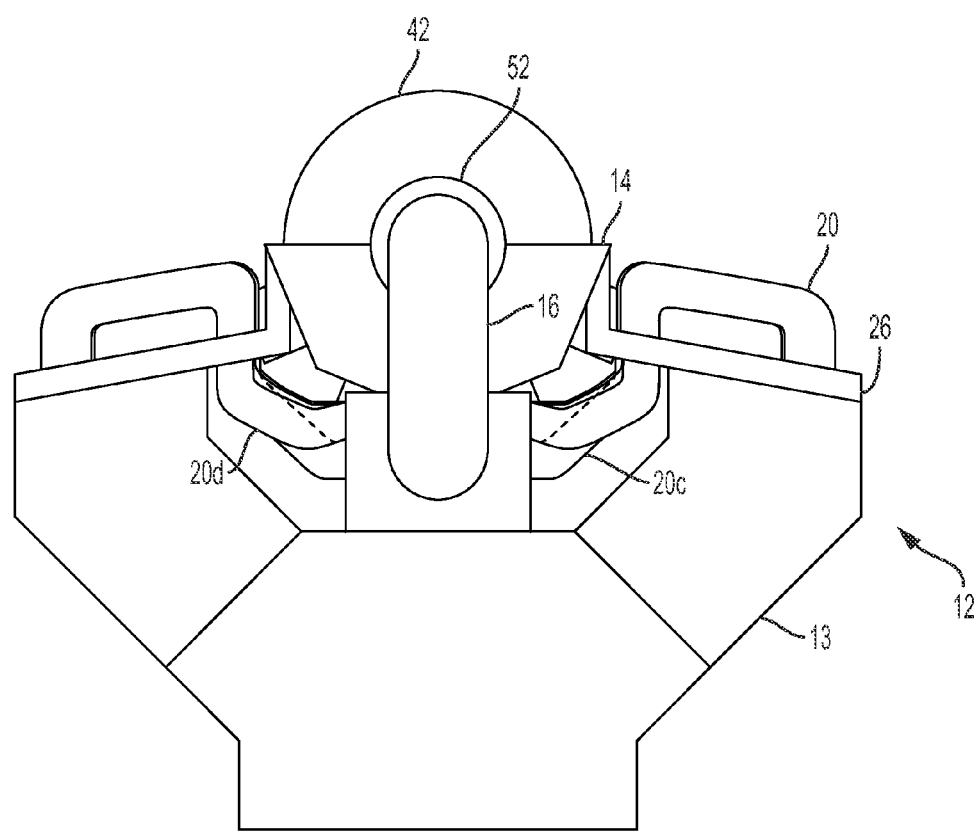
FIG. 6 is a rear elevational view of the thermal fuel delivery system of FIG. 1.

As depicted in FIGS. 3 and 5-6, the frame members 26 flare outward from the housing member 14 and are sized and shaped to rest and be secured to a cylinder head 30 of the engine block 12. As such the frame members 26 include securing holes 32 defined therein for receiving fasteners (not shown) to secure the insertion assembly 22 to the cylinder head 30. Further, the frame members 26 slope downwardly away from the housing 14 relative to a plane defined by the top surface of the intake manifold 18. The frame members 26 may further include a pair of elongated slots 34 defined therein for reducing weight of the insertion assembly 22 and providing for a cooling effect on the various components of the insertion assembly.

Referring to FIG. 3, the housing 14 includes a cavity 40 defined therein for receiving a fuel device 42. In one embodiment, the fuel device 42 may be similar to the fuel device described in U.S. Pat. No. 7,510,171, which is incorporated herein by reference. The fuel device 42 is capable of receiving injected fuel and heated air such that the fuel injected into the fuel device is thermally cracked by collision with the molecules of the heated air. The fuel device 42 then provides a thermally cracked fuel and heated air mixture to the engine. The term "thermally cracked" in relation to fuel is used to mean vaporization, volatilization, or decomposition of high molecule weight hydrocarbons to lower weight molecule hydrocarbons, or any combination thereof. The cavity 40 may be substantially hemispherical in shape and terminates at a proximal opening 44 such that a proximal end 46 of the fuel device 42 may extend through (and may protrude from) the opening to operatively couple to an airflow received from a heat exchanger as will be discussed. The proximal end 46 may be coupled to an air supply pipe using a v-clamp assembly. Fuel injector housings 47 may be distributed circumferentially about the proximal end 46 of the fuel device 42 to accommodate or mount fuel injectors that couple to the fuel device 42. A distal end 48 of the cavity 40 leads to a distal opening 50 of the housing to accommodate an outlet 52 of the vaporizer device 42. The housing further optionally includes a partial or full cover 54, which facilitates retention of the vaporizer device 42 in the housing 14. In this manner, the vaporizer device 42 may be disposed and retained in the housing 14 and the insertion assembly 22 may be disposed against a standard V-engine block. Of course, the vaporizer device 42 may also be attached to the housing 14 using bolts, and coupling the device 42 to the air supply pipe and the outlet 16 using v-clamp assemblies (with or without also bolting to the housing) may additionally secure the device 42.

The insertion assembly 22 further includes the aforementioned intake manifold 18, which supplies fuel mixture to the engine cylinders via the runner tubes 20. The intake manifold 18 may be a variety of shapes, such as the rectangular shape shown in FIGS. 5-6. The intake manifold 18 receives fuel mixture from the vaporizer device 42 via the outlet 52 coupled to the outlet tube 16. The outlet 52 may be coupled to the outlet tube 16 using a v-clamp assembly. The intake manifold 18 may be open or may include baffles for guiding the heated air/fuel mixture into the runner tubes 20 and thus into the cylinders of the engine 12. In one embodiment, based on characteristics of the vaporizer device 42, the intake manifold 18 may be reduced in size to accommodate approximately 4 liters of air in the intake manifold. The volumetric efficiency of the intake manifold is thus improved over conventional stock intake manifolds, which are larger in size (e.g., to accommodate as much as 36 liters of air). Further, the intake manifold 18 may be disposed below the interface of the runner tubes 20 and the cylinders of the engine 12. As such, the runner tubes 20 begin vertically below the interface between the runner tubes and the engine.

Accordingly, the insertion assembly 22 may be adapted for use in any automobile or vehicle having a V-engine block. It is designed to fit seamlessly into conventional V-engine blocks and feed fuel mixture to the engine using the vaporizer device 42.

Figure 9:
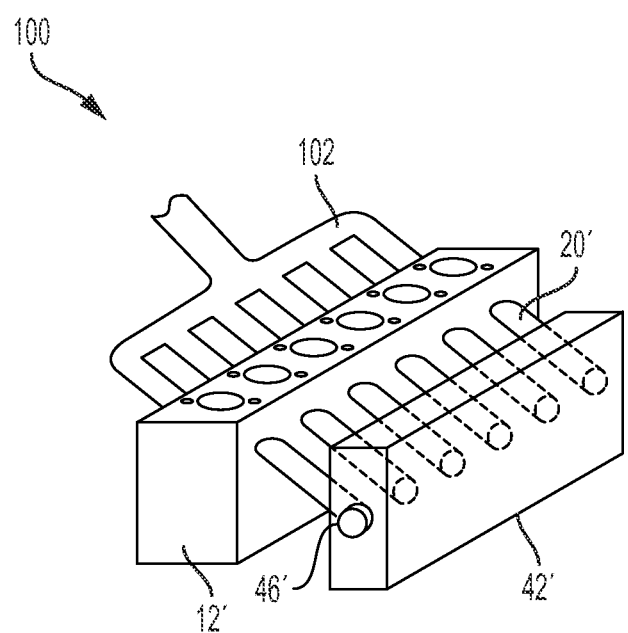
FIG. 9 is a perspective view of a thermal fuel delivery system according to the present disclosure.

Of course, the present disclosure is not limited to V-shaped engine blocks. FIG. 9 illustrates an example of a fuel delivery system 100 adapted for use with an in-line six cylinder engine. The fuel device 42' may be disposed adjacent to the longitudinal axis of the engine 12'. The outlet 16' may couple the fuel device 42' to the intake manifold 18'. The fuel device 42' may take a number of shapes to accommodate the position and space available in the engine bay. For example, the fuel device 42' may have a rectangular shape as shown in FIG. 9 having an inlet at a proximal end 46'. The fuel device 42' may have a plurality of outlets directly coupled to the cylinder intakes to reduce the amount of space needed in the engine bay. The fuel device may also be positioned on top, in front, or behind the engine. An exhaust manifold 102 may be provided at an opposing side of the engine 12'.

Figure 10:
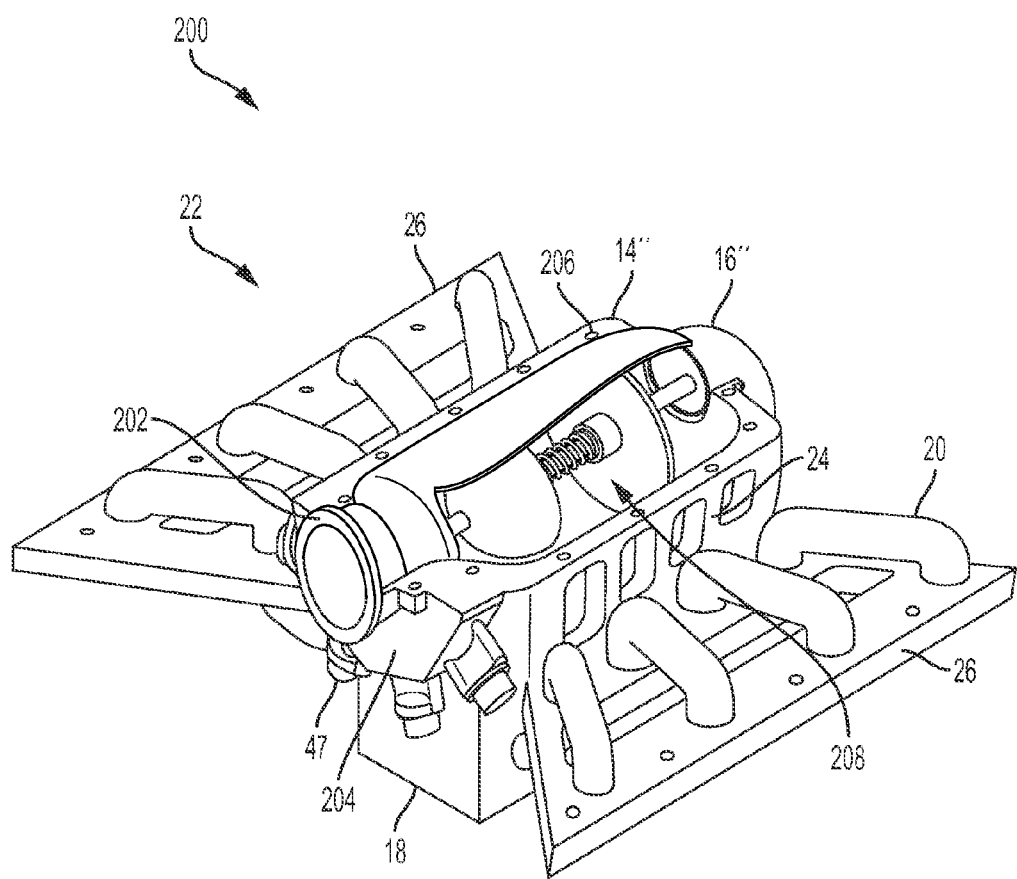
FIG. 10 is a perspective view of a thermal fuel delivery system including a partial cutaway view according to the present disclosure.

It will also be appreciated that in some embodiments, the fuel device may be integrated with the housing, for example, as shown in the fuel delivery system 200 of FIG. 10. Upper (202) and lower (204) portions of the housing 14" may be joined by bolts 206 and a gasket thereby providing access to the internal components 208 of the fuel device for installation and maintenance. The gasket may be PTFE Teflon or other similar materials. The outlet 16 may be coupled to the housing 14" by operation of bolting the upper and lower portions 202 and 204 together. The outlet 16" may also be coupled with the housing 14", for example using a v-clamp assembly, or may also be integrally formed with the housing 14", for example the lower portion 204. The outlet 16" may have an outwardly protruding lip at a proximal end thereof to facilitate connection with a v-clamp. The intake manifold 18 may optionally be formed as a unitary component with the lower portion 204.

Figure 11:
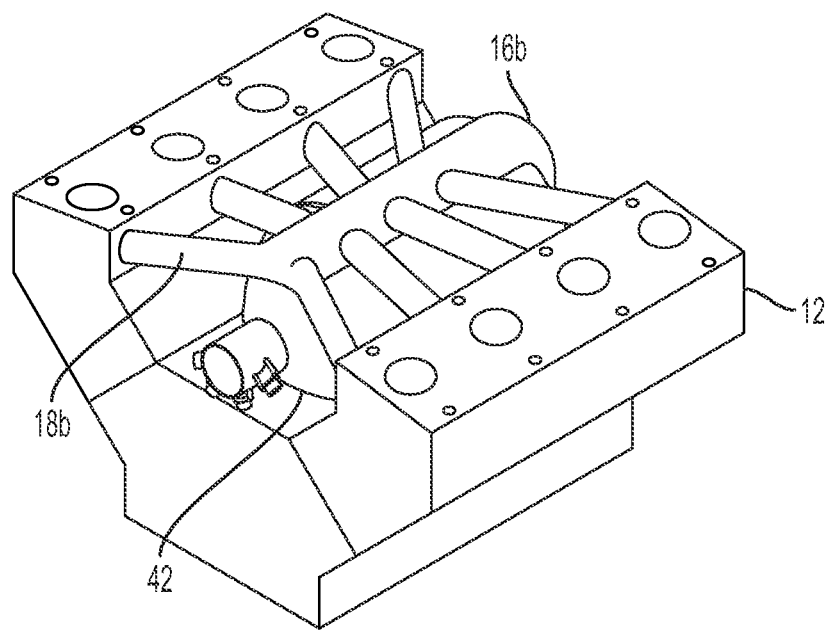
FIG. 11 is a perspective view of a thermal fuel delivery system according to the present disclosure.

And in still another embodiment, with reference to FIG. 11, the outlet 16b may curve upward away from the engine 12 such that the device 42 is positioned between the intake manifold 18b and the engine 12 in the vertical direction and between the cylinder heads in the horizontal direction.

Figure 7:
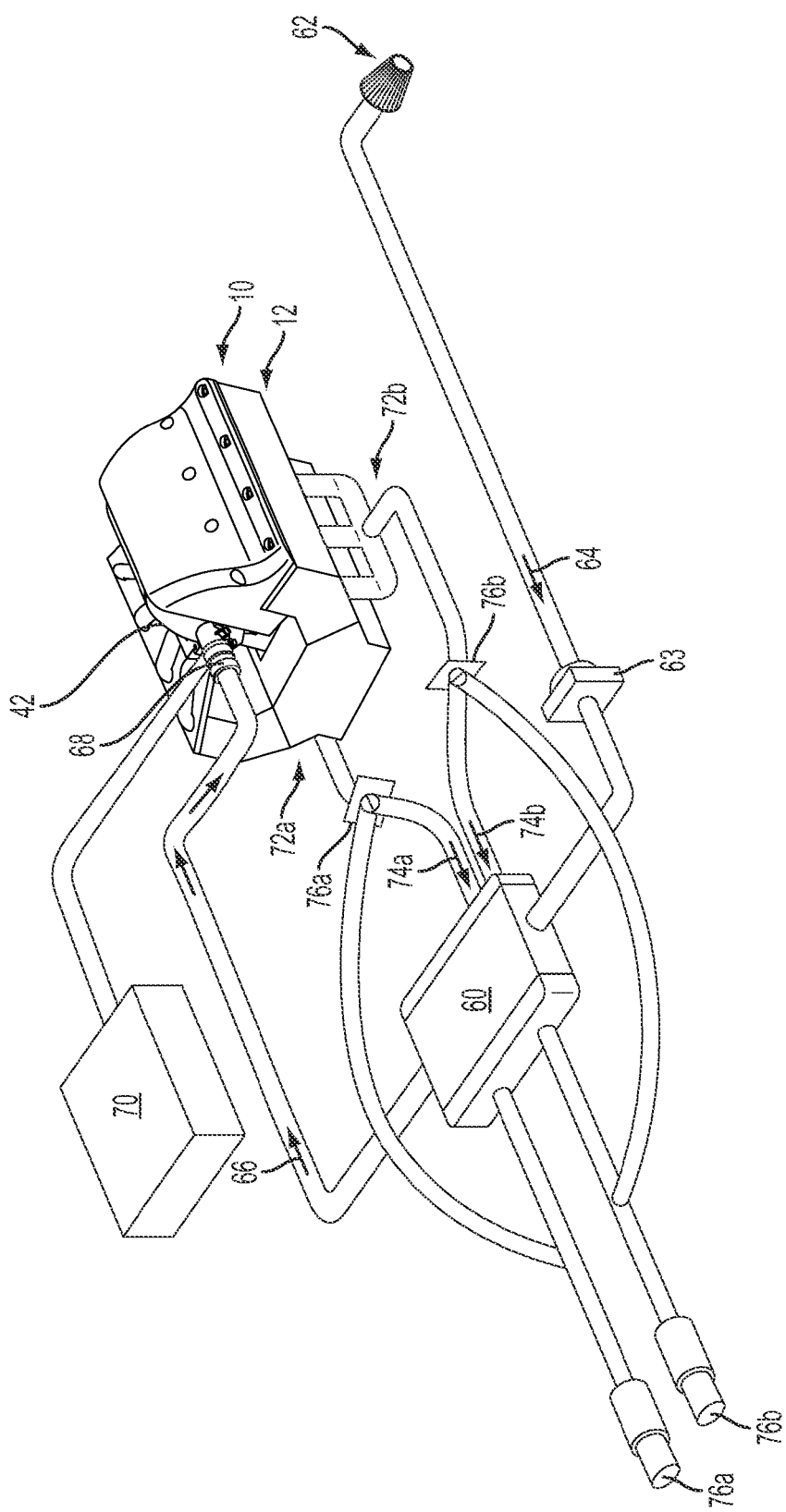
FIG. 7 is a block diagram of a fuel system incorporating the thermal fuel delivery system of FIG. 1.

Referring to FIG. 7, the thermal fuel delivery system 10 may be used in conjunction with a heat exchanger 60 that receives fresh air via a fresh air intake 62, such as an intake pipe or a variety of types of air filters. In one embodiment, the heat exchanger 60 may be the same as or similar to the heat exchanger described in U.S. Pat. No. 8,881,711, which is incorporated herein by reference. The fresh air taken from the ambient environment travels via a fresh air path 64 to the heat exchanger 60. In one embodiment, the fresh air passes through a throttle body 63. In other embodiments, the throttle body 63 may be disposed adjacent to the engine 12. The heat exchanger 60 heats the incoming fresh air path 64 to provide heated fresh air to a heated fresh air path 66, which in turn, is provided to the fuel device 42. The fuel device 42 receives fuel via one or more fuel injectors 68 coupled to a fuel supply 70. Thus, the fuel device 42 transmits a heated air/fuel mixture into the outlet 16 and thus into the intake manifold 18. The engine 12 emits exhaust air, which travels through exhaust manifolds 72a and 72b, respectively, via the exhaust air paths 74a and 74b to the heat exchanger 60. The exhaust air provides heat energy to the heat exchanger 60, thus heating the fresh cool air path 64. The exhaust air then exits via the exhaust ports 76a and 76b. The valves 76a and 76b may be used to bypass some or all of the exhaust air passing towards the heat exchanger 60. Thus, a temperature of the heat exchanger 60 and the heated fresh air may be controlled.

Figure 8:
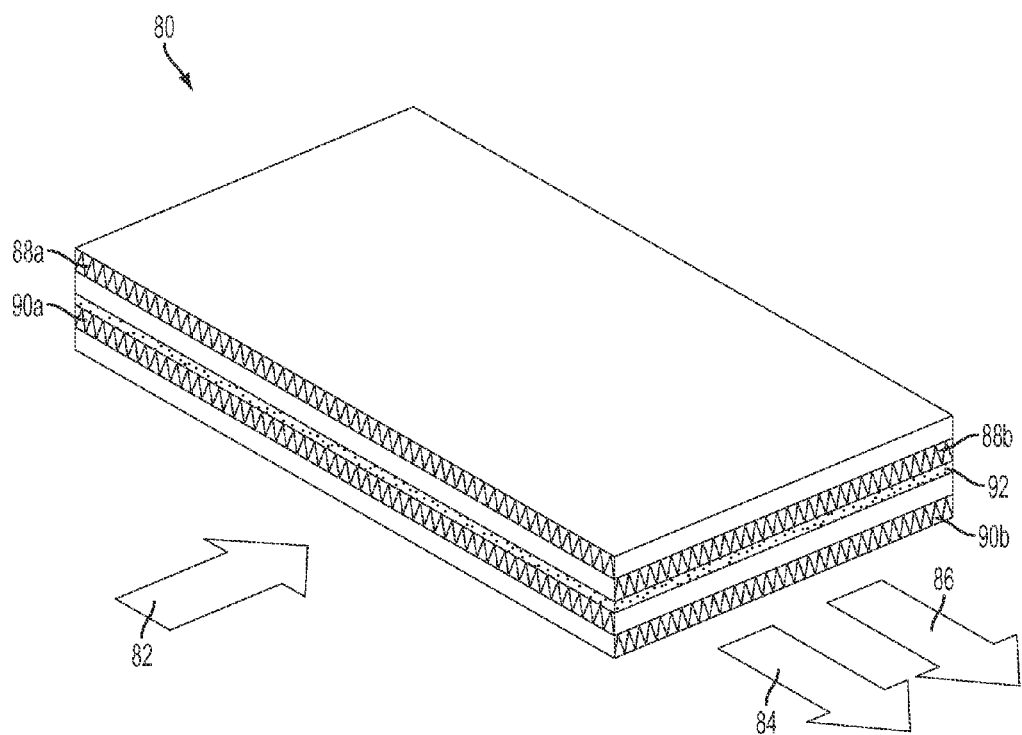
FIG. 8 is a perspective view of a heat exchanger for use with the thermal fuel delivery system of FIG. 1.

Referring to FIG. 8, an exemplary heat exchanger 80 may receive a first airflow 82, a second airflow 84 and a third airflow 86. In some embodiments, the heat exchanger 80 is an example of a heat exchanger that may be used for the heat exchanger 60. The airflows 82, 84 and 86 are independent from each other and separated by separators. In some embodiments, the airflows 82, 84 and 86 may be completely isolated, and thus are respectively sealed. However, in other embodiments, there may be a small amount of cross-flow between the air flows, for example, between the airflows 84 and 86 due to manufacturing tolerances or for other purposes. In still further embodiments, the first airflow 82 is independent from each of the second airflow 84 and the third airflow 86 such that in a fuel system like the fuel system 10, there is no mixing of fresh intake air and exhaust gases.

The airflow 82 is thermally coupled to the airflows 84 and 86 by the separators 88 and 90 respectively. The separators may be provided by an undulating or corrugated thermally conductive material such as aluminum and the separators may be oriented such that air flow is not impeded. For example, the separators 88 and 90 may have surfaces that are substantially smooth in the direction of the airflow 82 and the separators 88 and 90 may have surfaces that are substantially smooth in the direction of the airflows 84 and 86.

The airflow 84 corresponds with the lower portion of the heat exchanger 80, while the airflow 86 corresponds with the upper portion of the heat exchanger. The airflows 84 and 86 are separated by the separator 92. The separator 92 has a lower thermal conductivity than the separators 88 and 90 and thus provides thermal insulation between the airflows 84 and 86. Indeed, the lower thermal conductivity may be provided by a thicker portion of the same material for the separator 92 as compared to the separators 88 and 90. Or the lower thermal conductivity may be provided by using a different type of the same material used for the separators 88 and 90. For example, the separators 88 and 90 may be formed of standard aluminum (e.g., 6061), whereas the separator 92 may be formed of aviation aluminum (e.g., 7075). The lower thermal conductivity may also be provided by using a different material for the separator 92 as compared to the separators 88 and 90. For example, the separator 92 may be formed of carbon steel, stainless steel, or ceramics, while the separators 88 and 90 may be formed of aluminum.

In an application such as the fuel system shown in FIG. 7, the airflow 82 may correspond with a fresh air intake and the airflows 84 and 86 may correspond with exhaust air. Exhaust air temperatures can be extremely high. Accordingly, to prevent overheating, the exhaust air from each cylinder bank in an internal combustion engine may be routed through the heat exchanger 80 separately. Exhaust air flow may not be continuous, but rather may be a series of bursts of hot exhaust air. For example, a cylinder firing pattern may alternate between cylinder banks thereby providing a series of bursts of hot air to the heat exchanger 80 via the air flows 84 and 86 in an alternating pattern. Providing the exhaust flow to the heat exchanger 80 in the separate airflows 84 and 86 may therefore permit the heat exchanger to avoid an overheating condition since the portions of the heat exchanger associated with the airflows 84 and 86 are not exposed to all of the exhaust air. The heat exchanger 80 may provide heat transfer to the air flow 82 while not overheating.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A thermal fuel delivery system, comprising:
   an insertion assembly comprising:
      a housing including a cavity defined therein, the housing being coupled to a pair of frame members via a plurality of connecting members, the frame members extending laterally away from the housing;
      an intake manifold coupled to the housing via a tube; and
      a plurality of runner tubes respectively extending laterally away from the intake manifold, passing through the frame members at an inner portion of the frame members, extending laterally away from the intake manifold and along the frame members, and terminating at an outer portion of the frame members, the inner portion of the frame members being closer to the housing than the outer portion of the frame members; and
   a fuel device disposed within the cavity of the housing.

2. The thermal fuel delivery system according to claim 1, wherein the tube, the intake manifold and the runner tubes cooperate to define a fuel delivery path.

3. The thermal fuel delivery system according to claim 1, wherein the runner tubes define a fuel delivery path from the intake manifold to an engine.

4. The thermal fuel delivery system according to claim 3, wherein the intake manifold is disposed below an interface of the runner tubes with the engine.

5. The thermal fuel delivery system according to claim 1, wherein the frame members slope away from the connecting members.

6. The thermal fuel delivery system according to claim 1, wherein the housing includes a proximal opening defined therein, and the fuel device has a proximal end that extends through the proximal opening.

7. The thermal fuel delivery system according to claim 1, wherein the housing further includes a cover that partially extends over the fuel device.

8. An insertion assembly for adapting fuel device to an engine, the insertion assembly comprising:
   a housing including a cavity defined therein, the housing being coupled to a pair of frame members via a plurality of connecting members, the frame members extending laterally away from the housing;
   an intake manifold coupled to the housing via a tube; and
   a plurality of runner tubes respectively extending laterally away from the intake manifold, passing through the frame members at an inner portion of the frame members, extending laterally away from the intake manifold and along the frame members and terminating at an outer portion of the frame members, the inner portion of the frame members being closer to the housing than the outer portion of the frame members.

9. The insertion assembly according to claim 8, wherein the tube, the intake manifold and the runner tubes cooperate to define a fuel delivery path.

10. The insertion assembly according to claim 8, wherein the runner tubes define a fuel delivery path from the intake manifold to an engine.

11. The insertion assembly according to claim 10, wherein the intake manifold is disposed below a terminal end of the runner tubes.

12. The insertion assembly according to claim 8, wherein the frame members slope downwardly from the connecting members.

13. A system for delivering fuel mixture to an internal combustion engine, the system comprising:
   a thermal fuel delivery system comprising:
      an insertion assembly comprising:
         a housing defining a cavity, the housing being disposed above and coupled to a pair of frame members via a plurality of connecting members, the frame me b extending laterally away from the housing;
         an intake manifold coupled to the housing via a tube; and
         a plurality of runner tubes respectively extending laterally away from the intake manifold, passing through the frame members at an inner portion of the frame members, extending laterally away from the intake manifold and along the frame members, and terminating at an outer portion of the frame members, the inner portion of the frame members being closer to the housing than the outer portion of the frame members; and
      a fuel device disposed within the cavity of the housing, wherein the thermal fuel delivery system delivers a fuel mixture to the internal combustion engine; and a heat exchanger adapted to receive heated exhaust air from the internal combustion engine and fresh cool air to transfer heat energy from the heated exhaust air to the fresh cool air, and to provide the heated fresh air to the fuel device.

14. The system according to claim 13, wherein the internal combustion engine is a V-engine.

15. The system according to claim 14, wherein the insertion assembly is adapted to fit between cylinders of the V-engine.

16. The system according to claim 13, wherein the intake manifold is disposed below an interface of the runner tubes with the engine.

17. The system according to claim 13, wherein the frame members slope away from the connecting members.

18. The system according to claim 13, wherein the housing includes a proximal opening defined therein, and the fuel device has a proximal end that extends through the proximal opening.

19. The system according to claim 13, wherein the housing further includes a cover that partially extends over the fuel device.

* * * * *